United States Patent [19]

Fukuda et al.

[11] 4,230,903
[45] Oct. 28, 1980

[54] DATA TRANSMISSION SYSTEM

[75] Inventors: Takeo Fukuda; Kazuaki Kawabata, both of Yokohama, Japan

[73] Assignee: Tokyo Shibaura Denki Kabushiki Kaisha, Kawasaki, Japan

[21] Appl. No.: 31,737

[22] Filed: Apr. 20, 1979

[30] Foreign Application Priority Data

Apr. 28, 1978 [JP] Japan ................................. 53/51668

[51] Int. Cl.³ ............................................. H04L 5/14
[52] U.S. Cl. ..................................................... 370/24
[58] Field of Search ...................... 178/58 R, 58 A, 59, 178/60; 325/38 R, 38 A, 38 B; 179/15 BA, 15 BS

[56] References Cited

U.S. PATENT DOCUMENTS

| | | | |
|---|---|---|---|
| 3,936,602 | 2/1976 | Korver | 178/58 R |
| 4,071,692 | 1/1978 | Weir et al. | 325/38 A |

*Primary Examiner*—Thomas A. Robinson
*Attorney, Agent, or Firm*—Oblon, Fisher, Spivak, McClelland & Maier

[57] ABSTRACT

Data transmitted from a local terminal to a remote terminal is converted into such a diphase data signal that a data bit of binary "0" is represented by a signal with two transitions, and a data bit of binary "1" is represented by a signal with one transition. Data transmitted from the remote terminal to the local terminal is modulated by the diphase data signal of the local terminal, and delivered to the local terminal in the form of a diphase data signal. In the local terminal, the coded diphase data signal from the remote terminal is demodulated by the diphase data signal of the local terminal, and regenerated into the transmission data of the remote terminal.

5 Claims, 5 Drawing Figures

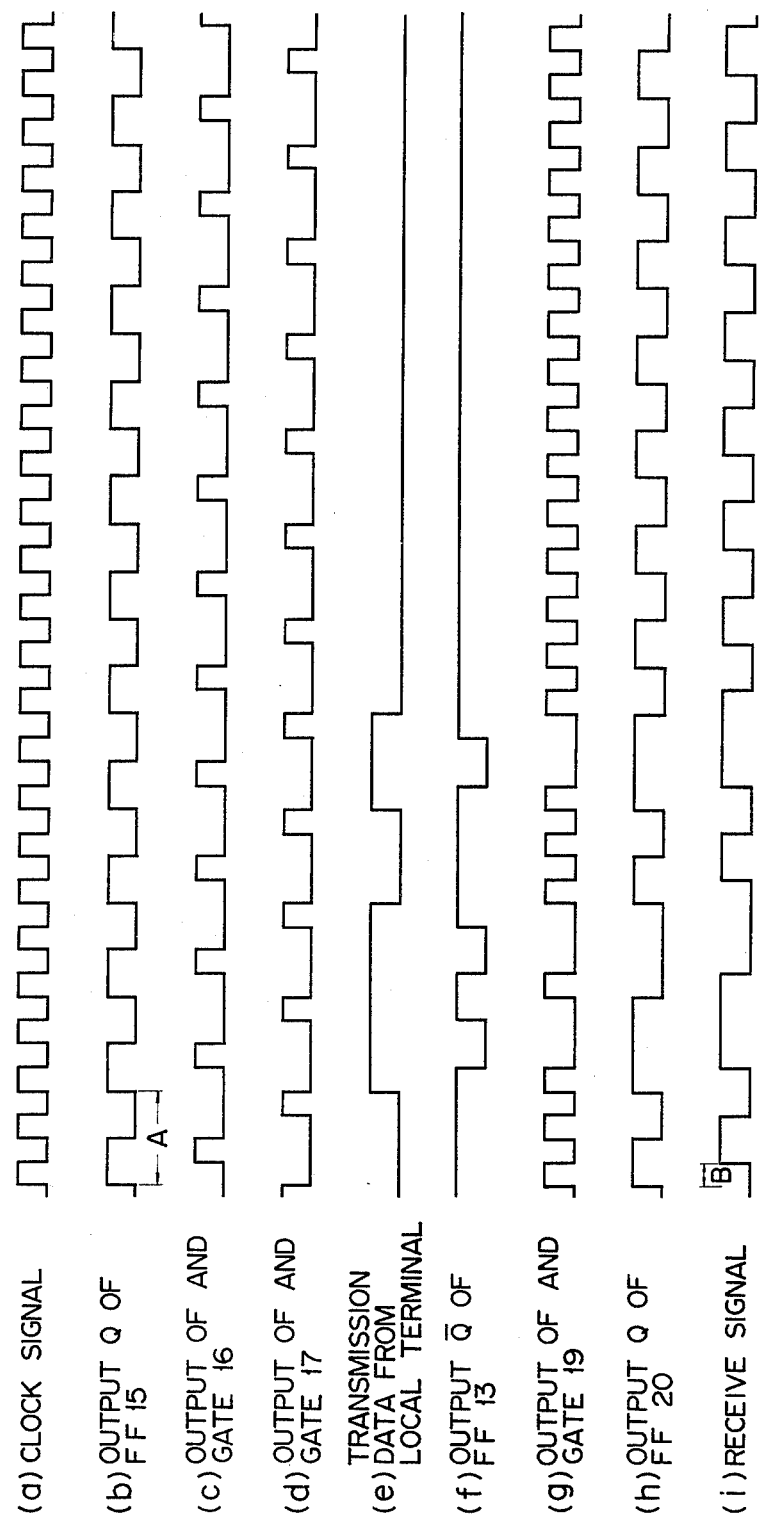

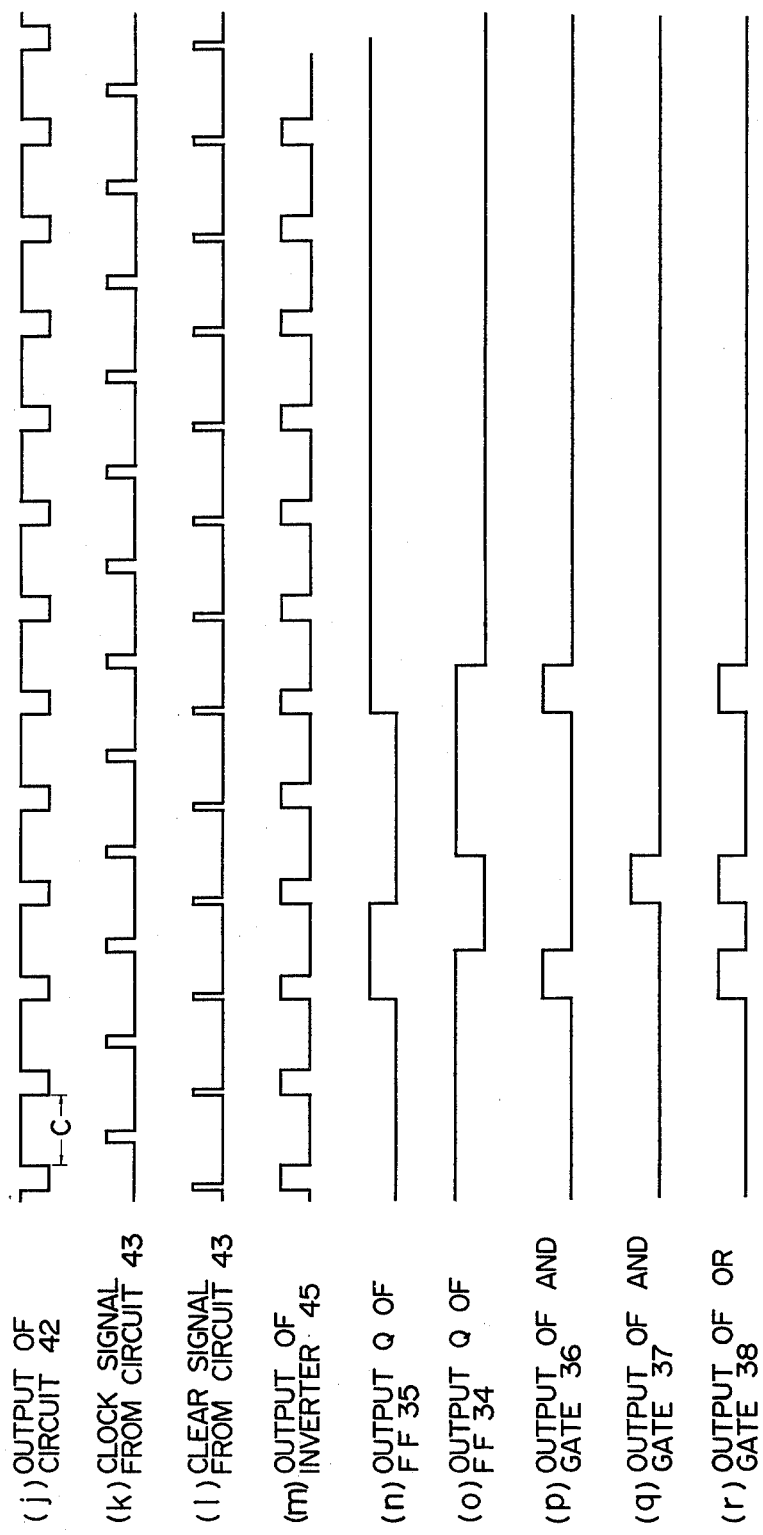

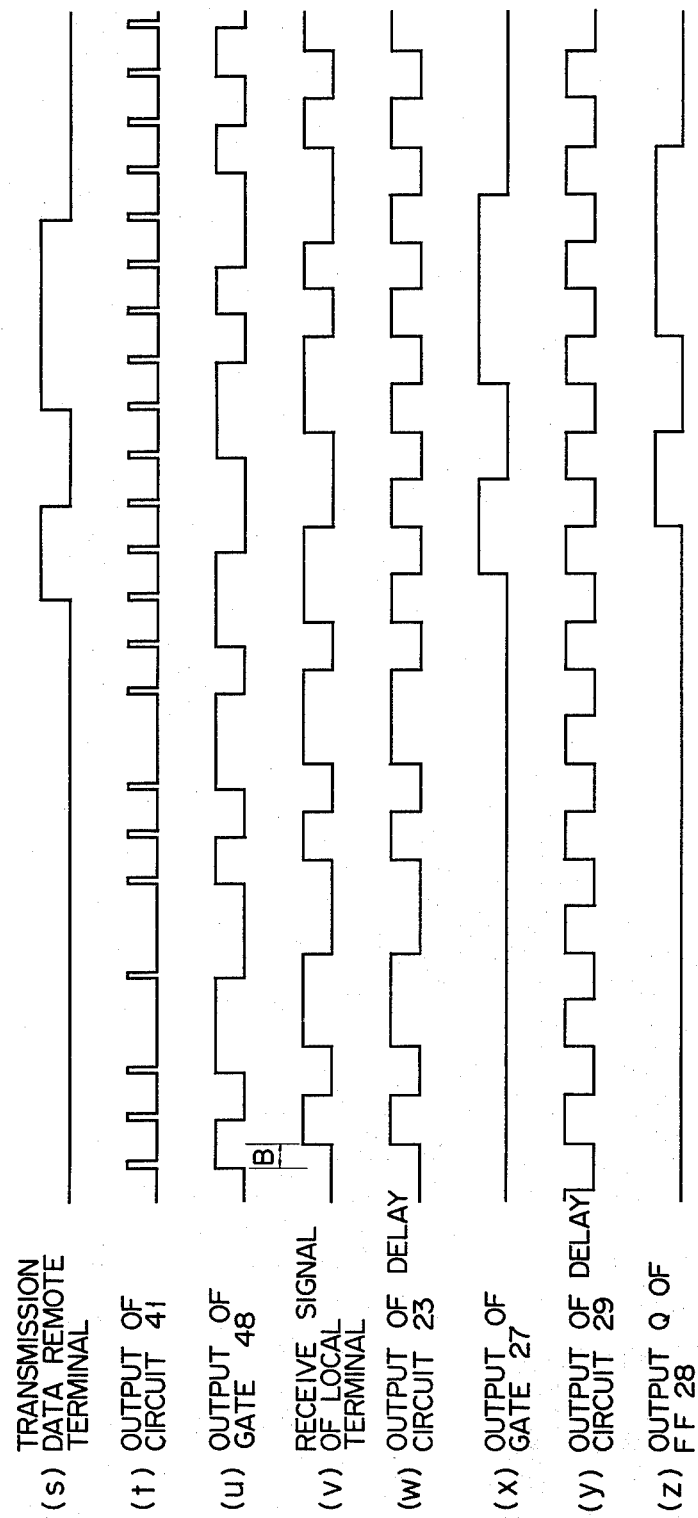

DATA TRANSMISSION SYSTEM

This invention relates to a data transmission system for transmitting data between a telephone terminal and a remote terminal by means of a two-way transmission line.

Key telephones, which are in fairly wide use nowadays, are capable of data transmission from telephone to remote terminals or from remote terminals to telephone terminals by means of a two-wire transmission line. One such key telephone is disclosed in U.S. Pat. No. 3,936,602. In this prior art key telephone, a coded diphase data signal with two or four transitions per data bit is transmitted from a local terminal to a remote terminal, which sends out a diphase code with one transition at an intermediate point of a signal representing one bit of the diphase data signal. Thus, pieces of information with at most four and two transitions per one data bit of the transmission data are transmitted from the local and remote terminals, respectively. With so many signal transitions, however, prolonged transmission distance would be liable to cause code errors due to deterioration in waveform, signal transmission delay and the like.

Accordingly, the object of this invention is to provide a data transmission system capable of representing information signals by codes with a reduced number of transitions, thereby improving the data transmission distance in each direction.

According to this invention, a data exchange is performed between local and remote terminals by converting transmitted data into such a diphase data signal that a data bit of a first binary state of the transmitted data is represented by a signal with two transitions, and that a data bit of a second binary state is represented by a signal with one transition. In this data exchange, a diphase data signal transmitted from the remote terminal is demodulated in the local terminal by a diphase data signal of the local terminal, whereby the transmission data of the remote terminal is reproduced.

This invention can be more fully understood from the following detailed description when taken in conjunction with the accompanying drawings, in which:

FIGS. 3A to 3C are time charts of signals at various parts of the circuits in both the local and the remote terminals of FIGS. 1 and 2.

Figure 1:
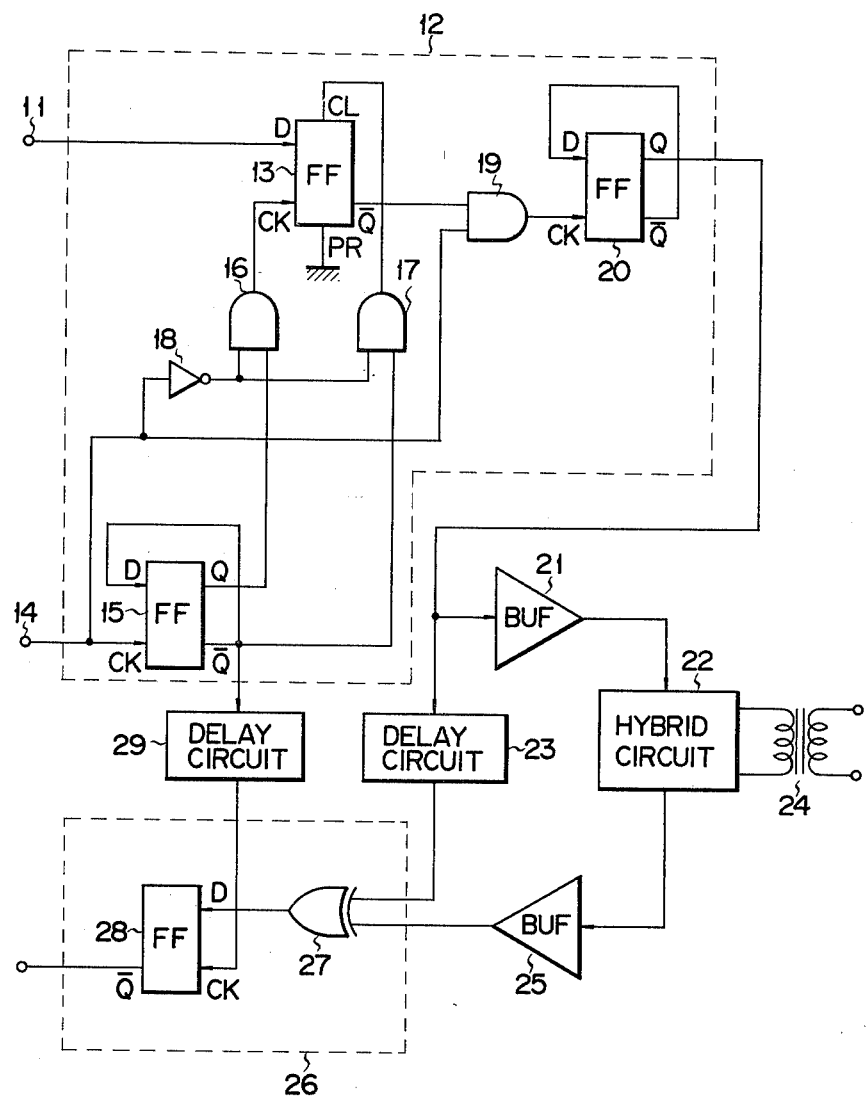
FIG. 1 is a circuit diagram of a local terminal of a data transmission system according to an embodiment of this invention.
Figure 2:
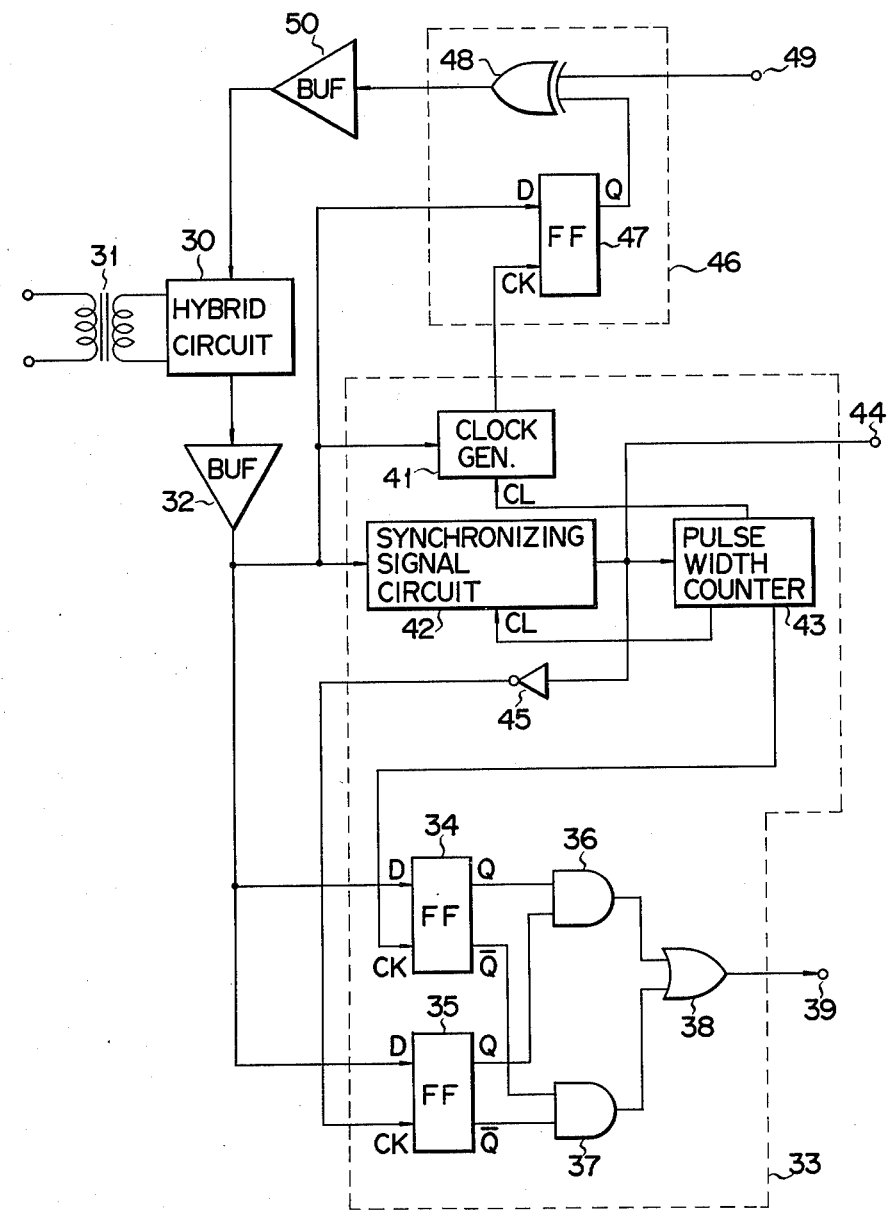
FIG. 2 is a circuit diagram of a remote terminal of the data transmission system.

FIGS. 1 and 2 show, respectively, local and remote terminals of a data transmission system according to an embodiment of this invention. In the local terminal of FIG. 1, a transmission data input 11 is connected to an input D of a D-type flip-flop 13 in an encoder 12. A clock signal input 14 is connected to a clock input CK of a D-type flip-flop 15. An output Q of the flip-flop 15 is connected to one input of an AND gate 16 of the encoder 12, while an output $\overline{Q}$ is connected to one input of an AND gate 17 and an input D of the flip-flop 15 itself. The other inputs of the AND gates 16 and 17 are connected with the clock signal input 14 through an inverter 18. The outputs of these AND gates 16 and 17 are connected to a clock input CK and a clear signal input CL of the flip-flop 13, respectively. An output $\overline{Q}$ of the flip-flop 13 is connected to one input of an AND gate 19. The other input of the AND gate 19 is connected to the clock signal input 14, while the output of AND gate 19 is connected to a clock input CK of a flip-flop 20. An output $\overline{Q}$ of the flip-flop 20 is connected to an input D thereof, and its Q output is connected to a hybrid circuit 22 via a buffer 21 and also to a delay circuit 23. A transformer 24 at the output of the hybrid circuit 22 is intended for AC-connection between the local terminal and a transmission line. Further, a receiving end of the hybrid circuit 22 is connected to one input of an exclusive OR gate 27, in a decoder 26, through a buffer 25. The other input of the exclusive OR gate 27 is connected to the output of the delay circuit 23, while the output of the gate 27 is connected to an input D of a flip-flop 28. A clock input CK of the flip-flop 28 is connected to the output of a delay circuit 29. The input of the delay circuit 29 is connected to the output $\overline{Q}$ of the flip-flop 15.

In the remote terminal of FIG. 2, a hybrid circuit 30 is connected to the transmission line through a transformer 31. An output from the hybrid circuit 30 is connected, through a buffer 32, to D inputs of flip-flops 34 and 35 in a decoder 33. The Q outputs of the flip-flops 34 and 35 are connected, respectively, to inputs of an AND gate 36, while their $\overline{Q}$ outputs are connected, respectively, to inputs of an AND gate 37. The respective outputs of the AND gates 36 and 37 are connected to a receive data output 39 via an OR gate 38. The output of the buffer 32 is connected to the inputs of a clock generator 41 and a synchronizing signal circuit 42. The output of the synchronizing signal circuit 42 is connected to a clock input CK of the flip-flop 35, in the decoder 33, through an inverter 45, as well as to a pulse width counter 43 and a synchronizing signal output 44. The pulse width counter 43, which is so constructed as to produce two types of output signals, has its one output connected to a clock input CK of the flip-flop 34 and another output connected to the clear signal inputs CL of the clock generator 41 and synchronizing signal circuit 42. The output of the clock generator 41 is connected to a clock input CK of a flip-flop 47 in an encoder 46. An input D of the flip-flop 47 is connected with the output of the buffer 32, while its output Q is connected to one input of an exclusive OR gate 48. The other input of the exclusive OR gate 48 is connected to a transmission data input 49, and the output of the gate 48 is connected to the hybrid circuit 30 through a buffer 50.

Referring now to the time charts of FIGS. 3A to 3C, there will be described the operation of the data transmission system with the above-mentioned construction.

When a clock signal (a) as shown in FIG. 3A is supplied to the flip-flop 15, a signal (b) with a time slot A is delivered from the output Q of the flip-flop 15. The signal (b) is generated with a frequency equal to half that of the clock signal (a). When the signal (b) is applied together with an inverted signal of the clock signal (a) to the AND gate 16, a signal (c) is delivered from the AND gate 16. Likewise, a signal (d) is delivered from the AND gate 17. When these output signals (c) and (d) of the AND gates 16 and 17 are supplied, respectively, to the clock input and clear signal input of the flip-flop 13 and transmitted data (e) is applied to the input D of the flip-flop 13, a signal (f) is delivered from the output $\overline{Q}$ of the flip-flop 13. When the signal (f) and clock signal (a) are supplied to the AND gate 19, a signal (g) is produced from the AND gate 19. When the signal (g) is supplied as a clock signal to the flip-flop 20, a diphase data signal (h) is produced from the output Q of the flip-flop 20. The signal (h) is supplied to the hybrid circuit 22 via the buffer 21. The signal (h), supplied to the hybrid circuit 22, is fed as a transmission signal from the local terminal to the transmission line through the transformer 24. The signal (h) has first and second signal portions. The first signal portion has two transitions during one time slot when the data bit of the transmission data is "0." The second signal portion has one transition during one time slot when the data bit of the tranmission data is "1."

The diphase data signal (h) is received at the remote terminal of FIG. 2 through the transmission line. In this case, the remote terminal receives the signal (h) after the passage of a transmission delay time B. A receive signal (i) is supplied to the buffer 32 via the transformer 31 and hybrid circuit 30. From the buffer 32, the signal (i) is supplied to the data input terminals D of the flip-flops 34 and 35. Also, the receive signal (i) is supplied to the clock generator 41 and the synchronizing signal circuit 42. The synchronizing signal circuit 42 delivers an output signal (j) with a pulse width C ($\frac{3}{4}$ of one time slot A) in response to the receive signal (i). The signal (j) is supplied to the pulse width counter 43, which measures a time length equal to $\frac{1}{4}$ of one time slot or A/4 from a rise of the signal (j), and which delivers a signal (k) and also a clear signal (l) in response to a fall of the signal (j), as shown in FIG. 3B. The signal (k) is supplied to the clock terminal CK of the flip-flop 34, while the signal (j) is inverted by the inverter 45 and supplied as a clock signal (m) to the clock terminal CK of the flip-flop 35. Thus, signals (o) and (n) are delivered, respectively, from the Q outputs of the flip-flops 34 and 35, and supplied to the AND gate 36. Further, inverted signals of the signals (o) and (n) are delivered from the respective $\overline{Q}$ outputs of the flip-flops 34 and 35, and supplied to the AND gate 37. Then, output signals (p) and (q) are delivered, respectively, from the AND gates 36 and 37 and supplied to the OR gate 38, where a signal (r) is produced. The signal (r), which corresponds to the transmitted data (e), consists of five time slots "0 1 1 0 1," as shown in FIG. 3A, and becomes a reproduction signal of "0 1 1 0 1" with the duty of $\frac{3}{4}$ time slot delay equivalent to $\frac{1}{2}$ time slot.

On the other hand, data transmission from the remote terminal to the local terminal is performed as follows. If data (s) as shown in FIG. 3C, for example, is to be transmitted from the remote terminal, it will be supplied to one input of the exclusive OR gate 48 in the encoder 46. The other input of the OR gate 48 is supplied with an output signal from the output Q of the flip-flop 47. The data input D of the flip-flop 47 is supplied with the receive signal (i), while its clock input CK is supplied with a clock signal (t) from the clock generator 41. Accordingly, the flip-flop 47 delivers the same signal as the receive signal (i) through its output Q. As a result, a diphase data signal (u) as shown in FIG. 3C is delivered from the exclusive OR gate 48. the signal (u) is transmitted to the local terminal via the buffer 50, hybrid circuit 30 and transformer 31.

The transmission signal (u) is received as a receive signal (v) at the local terminal of FIG. 1 after the passage of the transmission delay time B. The receive signal (v) is supplied to one input of the exclusive OR gate 27, in the decoder 26, via the transformer 24, hybrid circuit 22 and buffer 25. The other input of the exclusive OR gate 27 is supplied with a signal (w) obtained by delaying the signal (h) from the output Q of the flip-flop 20 by the transmission delay time B, and the exclusive OR gate 27 delivers a signal (x). The signal (x) is supplied to the data input D of the flip-flop 28. The clock input CK of the flip-flop 28 is supplied with a signal (y) obtained by delaying an inverted signal from the output $\overline{Q}$ of the flip-flop 15 by the transmission delay time B, and a reproduction signal (z) is delivered from the flip-flop 28, controlled by the signal (y).

Thus, according to this invention, a signal with two transitions may be transmitted when the transmission data is "0," while a signal with one transition may be transmitted when the transmission data is "1," in transmitting one bit of the transmission data. Namely, whether each bit of the transmission data is "0" or "1" is determined by whether the data bit has two or one transitions within one time slot. Accordingly, the transmission data can be transmitted in the form of a diphase signal with at most two transitions, thereby substantially reducing code errors attributable to waveform deterioration of the transmission signal, transmission delay and other causes. Moreover, according to the invention, the diphase data signal of the local terminal is delayed by the transmission delay time, and an exclusive OR of the delayed diphase data signal and the coded diphase data signal from the remote terminal is obtained, thereby reproducing the transmission data of the remote terminal. In consequence, if the transmission and reception data are transmitted in opposite directions, accurate data transmission may be achieved without bringing the transitions of the codes of the transmission and reception data into line with one another. That is, in this invention, the diphase data signal (i) from the local terminal is transmitted as it is when the transmission data of the remote terminal is "0," while it is transmitted after inversion when the transmission data is "1." This may be understood from the relationship between the signals (i), (s) and (u).

According to a test made on the data transmission system of this invention as described above, it was confirmed that transmission at a long distance of 12,000 feet or more may satisfactorily be achieved by using 24-gauge transmission lines. Thus, long-distance, two-wire, two-way data transmission may be performed effectively and efficiently, according to the invention.

Although, in the afore-described embodiment, the diphase data signal is obtained by providing the exclusive OR of the transmission data (s) of the remote terminal and the non-inverted output signal of the flip-flop 47 (signal from the output Q), it may otherwise be obtained by providing the exclusive OR of the data (s) and the inverted output signal. In this case, a reproduction signal is taken from the output terminal $\overline{Q}$ of the flip-flop 28 in the decoder 26 of the local terminal. Moreover, the delay circuits 23 and 29 may practically be omitted if the data transmission system of the invention is operated for half-duplex transmission. Furthermore, in transmitting signals with no transition successively from the local terminal, dummy signals for DC level compensation may be added.

Where the transmission distance between the local and remote terminals is short, the delay circuit may be omitted from the local terminal.

What we claim is:

1. A data transmission system for data transmission between local and remote terminals by means of a two-wire transmission line, said local terminal including a first encoder for converting binary data formed of a plurality of binary data bits into a diphase data signal having first and second portions, respectively, representing first and second binary bit states and provided, respectively, with two transitions and one transition, and a means for transmitting the diphase data signal from said first encoder to a two-wire transmission line, said remote terminal including a means for receiving said diphase data signal from said local terminal, a decoder for decoding said diphase data signal received by said receiving means into said binary data, a second encoder for converting, under the modulating influences of said diphase data signal, data to be transmitted from said remote terminal to said local terminal, thereby producing a remote terminal diphase data signal, and a means for transmitting the remote terminal diphase data signal from said second encoder to said two-wire transmission line, and said local terminal further including a means for receiving said remote terminal diphase data signal from said remote terminal, and a means for demodulating said remote terminal diphase data signal by means of said diphase data signal from said first encoder.

2. A data transmission system according to claim 1, wherein said first encoder is composed of a logic circuit for converting a data bit in the first binary bit state into a signal with two transitions and a data bit in the second binary bit state into a signal with one transition.

3. A data transmission system according to claim 2, wherein said first encoder is composed of a first flip-flop circuit for converting a clock signal into a singal with a frequency equal to half that of said clock signal and for delivering inverted and non-inverted output signals, a first AND gate supplied with the non-inverted signal from said first flip-flop circuit and an inverted signal of said clock signal, a second AND gate supplied with the inverted signal from said first flip-flop circuit and the inverted signal of said clock pulse, a second flip-flop circuit having a clock input to receive as a clock signal an output signal of said first AND gate, and a clear input to receive as a clear signal an output signal of said second AND gate, and a data input to receive said binary data, and an output, a third AND gate supplied with an output signal of said second flip-flop circuit and said clock signal, and a third flip-flop circuit receiving as a clock signal an output signal of said third AND gate and delivering said coded diphase data signal.

4. A data transmission system according to claim 1, wherein said decoder is composed of a synchronizing signal generator delivering signals with periods equal to $\frac{3}{4}$ and $\frac{1}{4}$ of the signal period of said transmission data in response to said diphase data signal, first and second flip-flop circuits supplied respectively with said $\frac{3}{4}$- and $\frac{1}{4}$-period signals as clock signals from said synchronizing signal generator and also with said diphase data signal, a first AND gate to receive non-inverted output signals from said first and second flip-flop circuits, a second AND gate to receive inverted output signals from said first and second flip-flop circuits, and an OR gate supplied with output signals of said first and second AND gates.

5. A data transmission system according to claim 1, wherein said demodulating means of said local terminal is composed of an exclusive OR gate supplied with the delay coded diphase data signal from said first encoder and said remote terminal diphase data signal, thereby reproducing the binary data of said remote terminal.

* * * * *